(No Model.) 7 Sheets—Sheet 1.

E. G. BLACK & J. F. WERLE.
PAGING MACHINE.

No. 567,958. Patented Sept. 22, 1896.

FIG. 1.

WITNESSES:
Edward C. Rowland
E. M. Taylor

INVENTORS
Edward G. Black
John F. Werle
BY
Redding & Riddle
ATTORNEYS (No Model.) 7 Sheets—Sheet 3.

E. G. BLACK & J. F. WERLE.
PAGING MACHINE.

No. 567,958. Patented Sept. 22, 1896.

WITNESSES:
Edward C. Rowland
E. M. Taylor.

INVENTORS
Edward G. Black
John F. Werle
BY
Redding & Riddle
ATTORNEYS (No Model.) 7 Sheets—Sheet 4.

E. G. BLACK & J. F. WERLE.
PAGING MACHINE.

No. 567,958. Patented Sept. 22, 1896.

WITNESSES: INVENTORS
Edward C. Rowland Edward G. Black
E. M. Taylor John F. Werle
 BY
 Redding & Kiddle
 ATTORNEYS

THE NORRIS PETERS CO., PHOTO-LITHO., WASHINGTON, D. C.

(No Model.) 7 Sheets—Sheet 5.

E. G. BLACK & J. F. WERLE.
PAGING MACHINE.

No. 567,958. Patented Sept. 22, 1896.

WITNESSES:
Edward C. Rowland.
E. M. Taylor.

INVENTORS
Edward G. Black
John F. Werle
BY
Redding & Riddle
ATTORNEYS (No Model.)  7 Sheets—Sheet 6.

E. G. BLACK & J. F. WERLE.
PAGING MACHINE.

No. 567,958. Patented Sept. 22, 1896.

Witnesses:
E. M. Taylor.
M. Gibson.

Inventors:
Edward G. Black
John F. Werle,
By Redding & Kiddle
Attorneys.

(No Model.) 7 Sheets—Sheet 7.

E. G. BLACK & J. F. WERLE.
PAGING MACHINE.

No. 567,958. Patented Sept. 22, 1896.

Witnesses:
M. Gibson
E. M. Taylor

Inventors
Edward G. Black
John F. Werle
By Redding & Kiddle
Attorneys

UNITED STATES PATENT OFFICE.

EDWARD G. BLACK AND JOHN F. WERLE, OF NEW YORK, N. Y.; SAID WERLE ASSIGNOR TO SAID BLACK.

PAGING-MACHINE.

SPECIFICATION forming part of Letters Patent No. 567,958, dated September 22, 1896.

Application filed October 11, 1892. Serial No. 448,494. (No model.)

*To all whom it may concern:*

Be it known that we, EDWARD G. BLACK and JOHN F. WERLE, citizens of the United States, residing in New York city, in the county and State of New York, have invented certain new and useful Improvements in Paging-Machines, of which the following is a specification.

The object of our invention is to produce a machine of such a construction and operation as will apply the numbers to consecutive pages of blank books and similar books, applying the even numbers to one side of one sheet while at the same time applying the odd numbers to the opposite side of another sheet; and a machine embodying our invention comprises mechanism whereby it will automatically continue numbering from units to tens, hundreds, thousands, and to almost any limit without stopping, the machine having a device which will shift the numbering mechanism automatically, so that when the units are exhausted the tens will be automatically thrown into operation, and the hundreds and thousands in like manner.

In the accompanying drawings, forming a part hereof.

Like letters and figures refer to corresponding parts in all the views.

A is a standard or frame which supports or to which is attached the mechanism proper comprising our invention.

B is a foot-lever pivoted at $b$ on the standard A, and by means of this foot-lever, through the pivoted arm $b'$ and elbow-lever $b^2$, which are attached to the lever B, motion is transmitted to the operating parts of the machine, as will be hereinafter explained. To the end of the upper arm of the elbow-lever arm $b^2$ are attached the two reciprocating arms C and C', each of which at its pivotal end is cut away a short distance for one-half of its thickness, so that when they are placed together, turning on the same pivot $a$, the thickness at that point will be no greater than the thickness of one of such arms $c$, so that they may move together like a pair of scissors, as will be hereinafter described, and so that the mechanisms or numbering-heads supported at their outer ends will come together in substantially the same perpendicular plane. To the outer ends of these arms are attached the curved arms or brackets D D', which are secured to said arms at or near their middle point, their inner ends being loosely united or pivoted together and turning upon a pivot fixed in the frame of the machine and their outer ends supporting the numbering-heads F F', which heads apply the numbers to the pages of the book.

E is a platform or table upon which the body of the book rests while the machine is printing the numbers on the corners of the pages, and this platform or table may be raised or lowered by means of the screw $e$ and crank $e'$, as will be readily understood. To restore the foot-lever to its original position after it has been lowered or pressed down to move the numbering-heads together and operate other simultaneously-acting devices, a spring G is attached thereto, which is expanded when the lever is pressed upon and which, when the pressure on the lever is removed, restores the lever and the parts operated thereby to their normal positions, and the extent of the downward movement of the lever on the side designed to be pressed by the foot is regulated by the adjusting-screw $g$, and the extent of the downward movement of the lever on the other side adapted to be forced down by the spring G is regulated by the screw $g'$.

Figure 1:
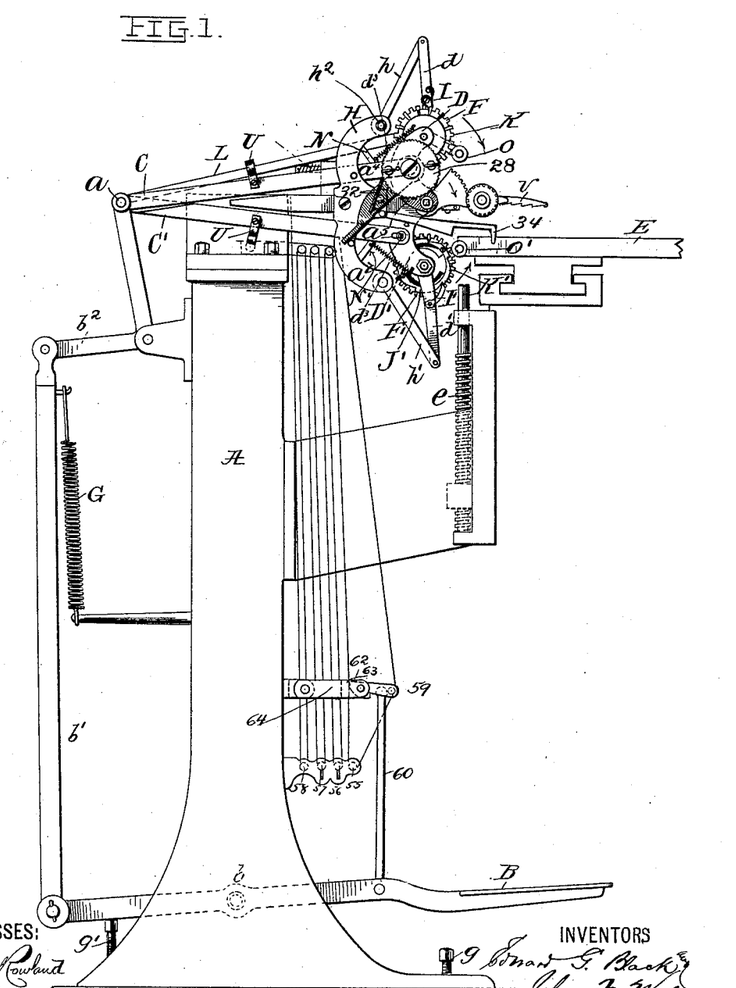
Figure 1 is a side view in elevation showing a machine embodying our invention.

H is a double-curved arm, as shown in Fig. 1, rigidly attached to the standard or an arm thereof, which supports on each end or to which is attached at each end an outwardly-projecting arm $h^2 h^3$, to which arms are pivoted the arms $h h'$, and to the opposite ends of the arms $h h'$ are loosely pivoted the arms $d d'$, and to each of the arms $d d'$ is fixed a spring-pawl I I', which is adapted to engage with a ratchet-wheel J J', connected to or forming part of the first disks K K' of the numbering-heads; that is to say, by the first disk we mean the disk which will print the units, and in the operation of the machine when the foot-lever is pressed downward the arms C C' move together like a pair of shears, the numbering-heads will make a circular motion toward each other to the sheets to be printed, the arms $h h'$ and $d d'$ will spread, the arms $d d'$ at the same time moving with the numbering-heads, and the pawls I I' will ride over the teeth on the ratchet-wheels J J' of the disks K K', and when the pressure is released from the foot-lever and the arms C C' and the other parts that are moved thereby returned to their normal position by means of the spring G the spring-pawls I I' will engage with the teeth on the ratchet-wheels J J', connected with the disks K K', thereby moving said disks and throwing into position another type on their peripheries ready to print when the foot-lever is again pressed and the parts thereby again thrown into printing position; and it will thus be seen that the turning of the disks is accomplished on the return stroke of the lever or on the return motion of the parts. On the same shaft or elbow-arm $b^2$ which supports the arms C C' are also attached two similar arms L L', also cut away for a short distance at their ends where they are pivoted together, so that they also shall move together in their operation like a pair of shears, and these arms are designed to operate the inking devices to supply ink to the printing-disks from a pair of inking-platens N N', there being one inking-platen for each inking device, and in the accompanying drawings the inking devices are shown as rollers O O'. The outer ends of each of the arms L L' are enlarged, as shown, having pins $n n'$ attached thereto, which engage with cams M M', pivoted on the supporting-arms $m m'$, attached to the standard A, the pins $n n'$ traveling in grooves or slots in the cams M M', and on the same spindles which support the cams are also pivoted the arms $o o'$, which bear on their outer extremities the ink-rollers O O'; and it will also be observed from the drawings that in each end of the arms L L' is cut a groove or slot $l l'$, in which grooves or slots the screws P P' travel for the reasons to be presently explained, said screws P P' being fastened to cams M M'.

In the operation of the machine when the foot-lever is pressed upon the arms L L' will be moved forward and together in the same manner as the arms C C' and the cams M M' will move around, carrying the arms $o o'$ and the ink-rollers O O' with them in a circular direction between the numbering-heads and rearward onto the ink-platens N N' to give the rollers a fresh supply of ink. On the return of the parts by the removal of the pressure, as before explained, the cams M M' will reverse their motion and the ink-rollers will be correspondingly moved to apply the ink to the types on each of the numbering-heads next designed to print, so that it will also be seen that while the numbering-heads are printing the ink-rollers are out of the way, procuring a fresh supply of ink, and on the return of the parts the ink-rollers apply ink to the numbering-heads. As there is a space between each of the type of the numbering-disks, it has been found that by the operation of the machine, if the ink-rollers commence to move inwardly at the same moment as the numbering-heads move downward, they are liable to fall between the teeth on the periphery of the disks and lock the machine. Therefore to obviate this a slight lead is given to the ink-rollers and they are moved or forced slightly ahead in advance of the heads or numbering-disks before the latter begin to move, thereby carrying the ink-rollers out of the way of the numbering-heads before the latter move and preventing the engagement of the ink-rollers with the numbering-heads, which has a tendency to block the machine, as above stated. To procure this lead, the grooves $a^4 a^5$ are cut into the ends of the arms C C', and when the foot-lever is pressed in the operation of the machine the arms L L' move slightly forward and downward before the arms C C' commence in their motion toward each other, the pins $a^6 a^7$ traveling in the grooves $a^4 a^5$ in the arms C C' before these arms are moved, which gives the advance lead or motion to the arms L L', or, rather, the arms C C' will ride over the pins $a^6 a^7$, retarding the forward motion of the numbering-heads, as before explained.

The ink-rollers have in the meantime been moved rearward and downward and out of the way, and to give this forward motion the cams M M' are cut away or grooved, as shown, having a straight groove on their inside toward the middle of the machine, as shown in the drawings. While the arms L L' are riding over the screws P P', the pins n n' will bear against the ends of the grooves of the cams M M' and thereby quickly operate the ink-rollers at the beginning of their movements to procure the lead to the ink-rollers for the purpose stated, and the pins n n' will work in the straight portions of the grooves of the cams M M' toward the latter part of the movements of the inking-rollers, thereby causing the ink-rollers to move more slowly while the printing operation is being performed. There is a spring $d^3$ $d^3$, Fig. 1, connected at one end with each arm C C' and at the other end to the curved arms or brackets D D', and the tension of which spring is against the forward motion of said arms, serving as an additional means of retarding the numbering-heads connected with said arms, in order to give the lead to the inking-rollers above mentioned.

Figures 2, 6:
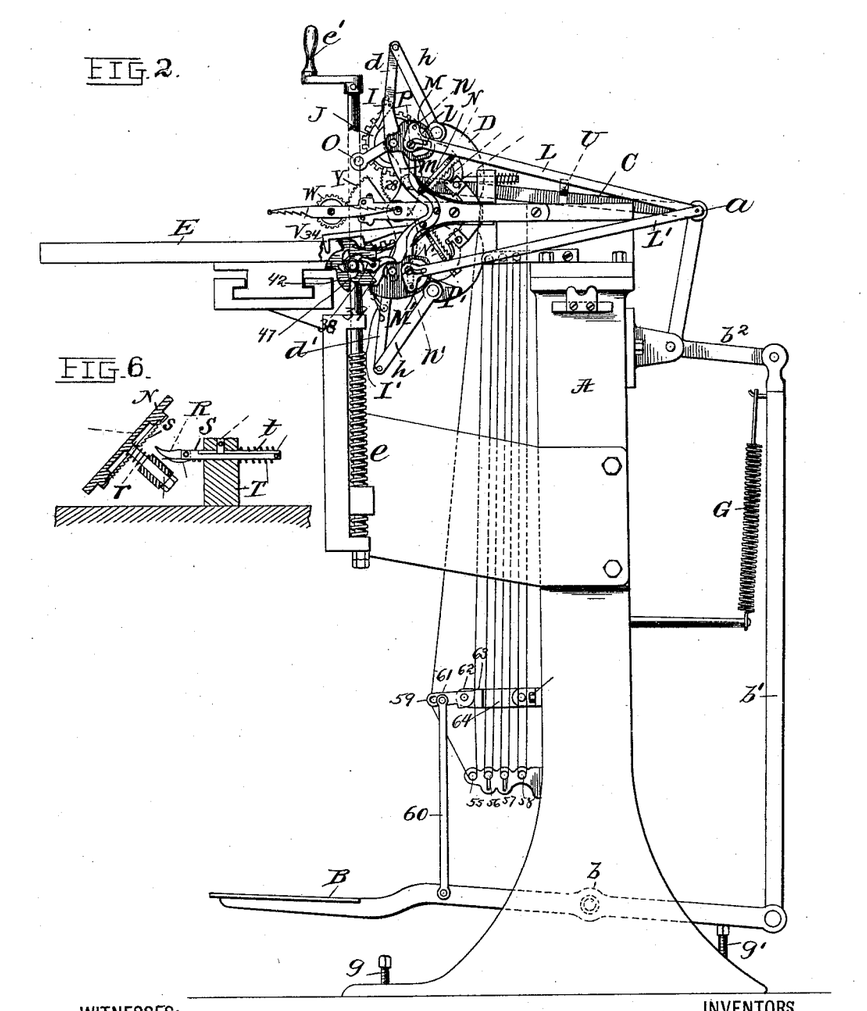
Fig. 2 is a side view in elevation of the machine shown in Fig. 1, but looking from the opposite direction.
Fig. 6 is a sectional view of the inking-plate and the mechanism to revolve it.
Figure 5:
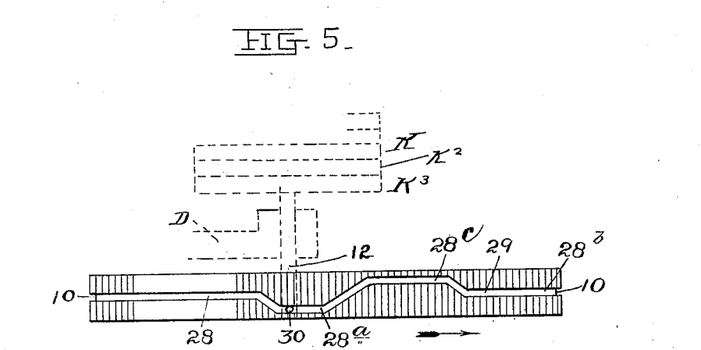
Fig. 5 is a plan view of the toothed or ratchet wheel, showing the groove on its periphery and the pin which passes therethrough for shifting the numbering-head.
Figure 7:
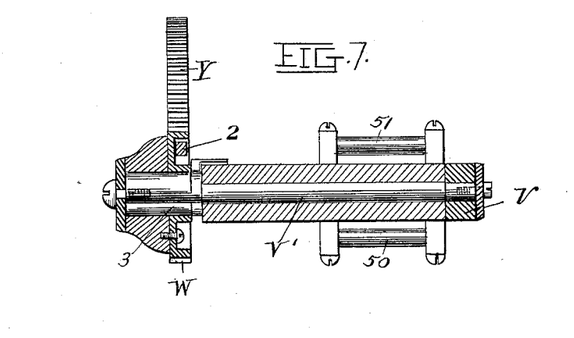
Fig. 7 is a sectional view of the mechanism shown in Fig. 4, taken through line $xx$ of that figure and looking in the direction of the arrows on that figure.
Figure 8:
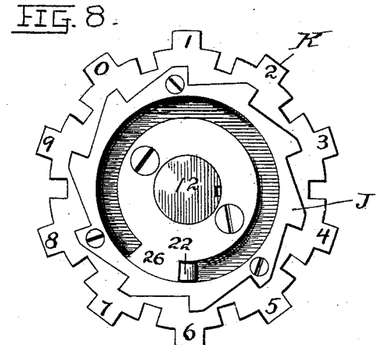
Figs. 8, 10, and 12 are side views of three numbering-disks.
Figure 9:
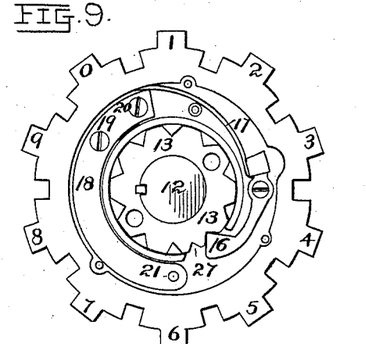
Figs. 9, 11, and 13 are side views of the same three disks shown in Figs. 8, 10, and 12, but showing the opposite sides of such disks.
Figure 10:
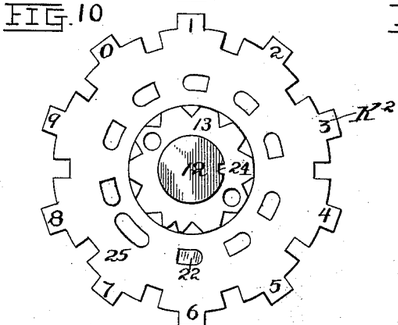
Figure 11:
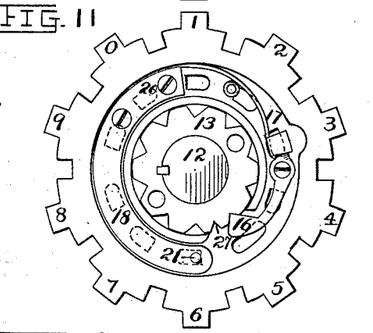
Figures 12, 13, 14:
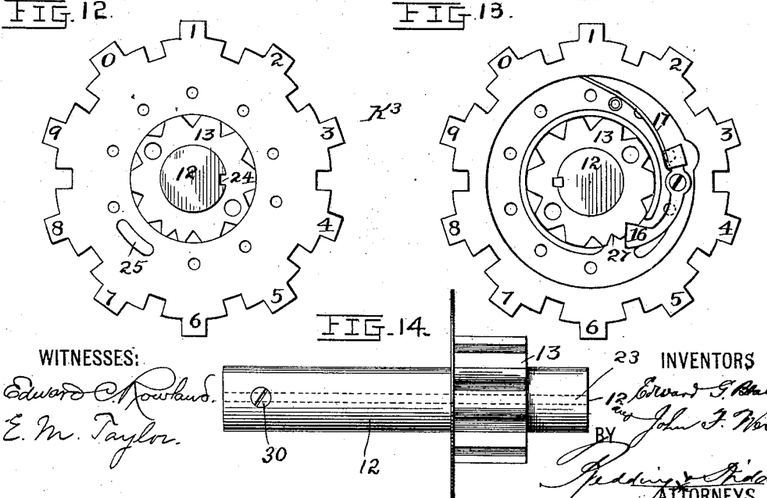
Fig. 14 is a detailed view of the shaft and grooved collar which supports the numbering-disks of the upper numbering-head.
Figure 15:
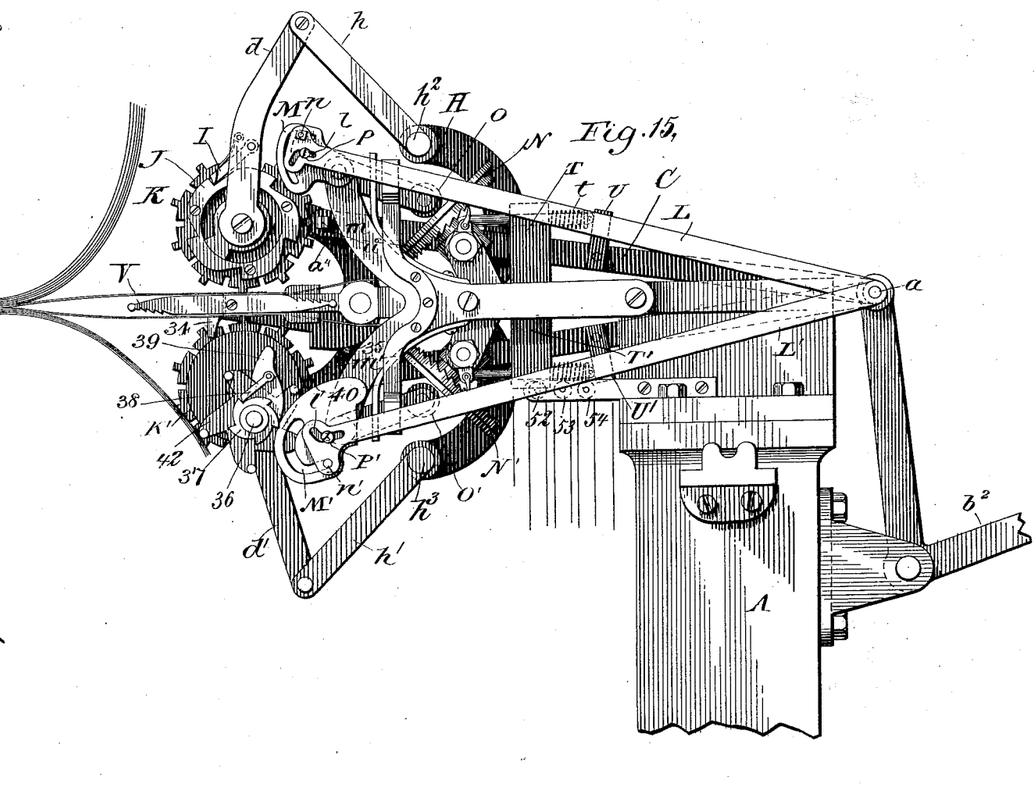
Fig. 15 is an enlarged side view of the machine shown in Fig. 1 with the lower part of the standard broken away, showing the parts more clearly in printing position and representing by lines the side edges of a book being printed upon and the manner of printing the opposite sides of two pages at the same time, and also showing the pages already numbered or paged held out of the way by the star-wheel, to be hereinafter explained.
Figures 16, 17:
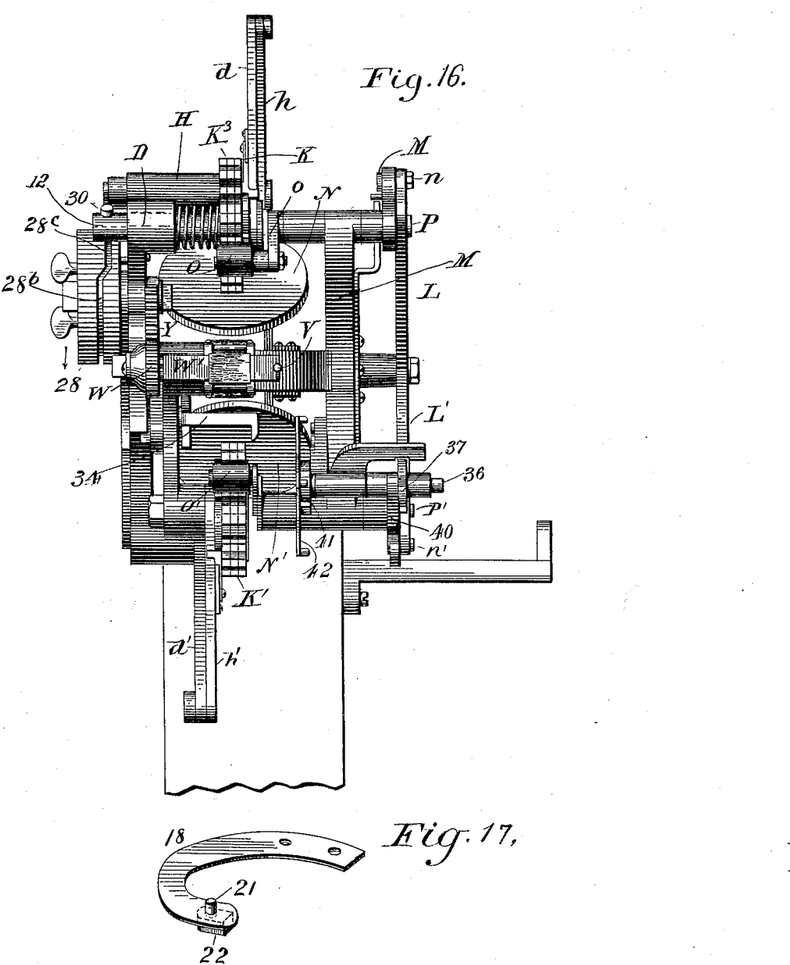
Fig. 16 is an enlarged front view of the upper portion of the machine, showing some details of construction.
Fig. 17 is a detailed view of the curved piece 18, showing both the pins 21 and 22, the function of which piece will be hereinafter set forth.

The ink-platens N N' are arranged in an angular position, as shown in Figs. 2 and 8, and to the under sides thereof, around the shaft which supports them, is placed a spring $r$ $r'$, which gives a slight yield to the platens when the ink-rollers engage therewith; and on the under side of these platens, near their outer edge, is cut a series of teeth, with which engages a spring-pawl R R', supported on the end of an arm S S', which is attached to an upright T T' of the standard A, and to the other end of the arm S S' is attached a spring $t$ $t'$, which also yields when the ink-roller engages with the ink-platens, thereby giving an elastic yield to the pawls R R' when they engage with the teeth $s$ $s'$. By means of these teeth $s$ $s'$ and the pawls R R', which engage therewith, the platens N N' are moved around a slight distance at each operation of the machine, so as to keep the ink on their surfaces continually uniformly distributed, and the pawls R R' engage with the teeth $s$ $s'$ through the medium of projections U U' on the arms C C', which projections move forward in the operation of the machine, striking the shafts S S' and moving these shafts and pushing the pawls R R' against the teeth $s$ $s'$, thereby rotating the ink-platens N N', as before stated, and when the pressure is released and the projections U U' drawn away from the shafts S S' the springs $t$ $t'$ will restore the shafts S S' to their normal position. The numbering-heads, of which there are two, consist of one or more disks K $K^2$ $K^3$, sleeved to the same shaft 12 or directly to a grooved collar 13, which is secured thereto or forms a part thereof, and all the disks are adapted to move independently of each other, but also to be automatically locked together in the operation of the machine. Each of the disks has the figures or type "0" to "9" on its periphery and the disk K of each head prints first, being operated by the pawl I I' and the ratchet J J', as before explained, and when the disks K K of the separate numbering-heads have numbered or paged the consecutive pages of the book from "1" to "9," inclusive, the second disks $K^2$ $K^2$ are automatically thrown into operation and advanced a step, so that the type on their peripheries when printing will now print together with the type on the disks K K, so as to print the changed denominations. All the disks, except K K, when thrown into operation as described, remain in their changed or automatically-adjusted position as to the printing-points during one revolution of the disks K K, but they are advanced step by step to change the denomination of the numbers being printed. The disks K K are moved or partially rotated at each pressure of the lever, so as to bring each type or alternate type on their peripheries into printing position with each operation of the machine, as will be readily understood. The disks $K^2$ $K^2$ automatically move to throw one of the types on the periphery of said disks into position once to every five movements of the disks K K, or after every nine numbers have been printed by the numbering-disks K K, to change the denomination from units to tens, to twenties, thirties, &c., up to ninety-nine. Then the disks $K^3$ $K^3$ are automatically thrown into operation in the same manner as the disks $K^2$ $K^2$ and operate once every time ninety-nine numbers are printed by the disks K K and $K^2$ $K^2$ to change the denomination from "ninety-nine" to "one hundred," to "two hundred," to "three hundred," up to "nine hundred and ninety-nine," when another disk would be automatically thrown into operation, and so on indefinitely. The disk K on one side is constructed as shown in Fig. 8, as before stated, with the ratchet J forming part thereof, with which engages the spring-pawl I above referred to, as shown in Fig. 1. On the other side of this disk is connected a spring-pawl 16, one end of which is adapted to drop into the grooves on the collar 13, a piece of spring-steel 17 engaging with the other end of said pawl, and in the operation of the machine this spring-pawl drops consecutively into each of the grooves on the collar 13. There is also a curved piece of metal 18 secured at one end to the disk by the screws 19 and 20, the other end of said metal piece 18 being free and having on one side the projection 21 and on the other side the projection 22, which passes through an opening in the disk K. Each of the disks is correspondingly constructed with the spring-pawl 16 and spring 17 and curved piece 18, with projection 21, but only the curved piece 18 on the disk K has the projection 22 on the other side. These disks are placed together over the grooved collar, on the inside of which is a key 23, which slides in a keyway or groove 24 in the shaft 12, securing the collar on the shaft and locking them together against lateral motion, and when all the disks are in place they are adapted to be locked together at the desired times for the printing of the appropriate numbers by means of the projections 21 on the curved pieces 18, which fall into the openings 25, with which these projections engage in the manner to be presently explained. On the end of the collar 13 is a rim 13', having a projection 26, which is adapted to engage with the projection 22 of the disk K, as shown in Fig. 8. When the disk K has printed five alternate numbers, (each of the disks of both of the numbering-heads only printing every other number, i. e., the upper one starting with "2" on one side of the sheet, and the lower disk printing the number "1" on the under side of that same sheet while the upper disk is printing "4" on one side of another sheet, and so on,) the projection 26 will be against the projection 22, which projection 22 is on the opposite side of the projection 21, as before stated, and projection 21 will then be over the opening 25 in the adjoining disk, which it will enter by the next operation of the machine, and the edge of which opening this projection 21 will engage with, locking the disk K to its adjoining disk, (and the operation is the same with the other disks,) thereby rotating it into printing position for the next number. This in the case of the first and second disks will occur when the first disk has printed five numbers, bringing into printing position the figure "1" on the second disk while the "0" is in printing position on the first disk, printing them together. When the second disk has been removed, the projection 26 passes over the projection 22, which will then spring back, allowing the projection 21 to return out of the opening 25, leaving the adjoining disk in its then position, while the first disk continues to rotate at each operation of the machine until the disks K K have printed up to nineteen, when the same change will take place, bringing the "2" of the second disk into position. This continuous locking and releasing of the first disk with the second disk will continue until the machine has printed "99," when the third disk will in the same manner be locked to the others, throwing one of its type into printing position, and so on, no matter how many disks are used, according to the size of the book and the number of pages to be paged or numbered, as will be clearly understood. In order that all the disks will not print during or with the first rotation of the first disk, the other disks are adjusted by hand, so that the spring-pawls 16, connected with them, will engage with and be held by what we call a "half-way" groove 27 on the collar 13, thereby putting the type on the peripheries of those disks on a plane between the type-arms of the first disk. To accomplish the shifting or changing of the numbering heads or mechanisms, so that each head may print exactly opposite to the other on the opposite leaves of a book, there is a toothed wheel 28, (see Figs. 1, 3, and 5,) having a groove or channel 29 cut thereon on its periphery at different distances from the margin of the wheel, in which groove or channel travels a pin 30, secured on the end of the shaft 12, supported in bearings on the end of the arm D, so that this toothed wheel moves with the numbering-head. By means of a pawl 32, which engages with the teeth on the wheel 28 on the backward or return motion of the parts of the machine, this wheel 28 is moved one tooth or two teeth, as may be desired, thereby shifting the upper numbering-head laterally in order to permit this head to print the figures on the upper corner of the leaf exactly opposite to those printed by the lower numbering-head on the lower or under corner of the leaf. In the forward motion of the parts the pawl 32 rides over the teeth on the wheel 28 and engages therewith only on the return motion, as before stated, as will be seen by Figs. 1 and 3. In the drawings is represented a wheel only of such size as will take the necessary teeth for shifting in printing up to one thousand, but the wheel will be made larger and have more teeth where a greater number of disks is employed to print a higher number than three figures, or one thousand and above. In other words, the two numbering-heads are so adjusted with relation to each other that they will print in substantially the same perpendicular plane, and the lower one is maintained rigid or in a fixed position while the other one is adapted to be shifted by means of the wheel 28 just described, but of course the positions of the fixed and shifting heads may be reversed, if desired. Before starting, the pin 30 is in the groove farthest away from the numbering-head, (numbered 28ª,) which groove is ten teeth in length, because when the upper disk has printed four alternate or nine consecutive numbers the pin 30 will have traveled to the groove 28ᵇ, which is near the middle of the periphery of the wheel 28, through which groove the pin 30 will travel, being moved up two teeth each operation of the machine until the machine has printed "99," when it will have reached the groove 28ᶜ, through which groove it will travel until it has printed "999," or it can be correspondingly moved into another groove to enable the machine to print in the denomination of one thousand, and so on, the numbering-head F being moved over the appropriate distance at each time that the pin changes its position on the periphery of the wheel 28, as will be readily understood. As shown, a portion of the periphery of the wheel 28 is unprovided with teeth, (see Fig. 5,) and the pawl 32, after it has moved the wheel into position to bring the pin 30 into the groove 28ᶜ, moves into this smooth place and does not therefore further actuate the wheel 32, and the wheel 32 will remain at rest and the disks remain in lateral position to print hundreds or from three disks until the maximum number or limit of the construction shown has been printed. The body of the book is supported on the table E, as above described, and the operator permits the corners of the pages to fall successively one at a time upon the upper surface of the impression-platens W'.

In further explanation of the necessity for shifting but one of the two numbering-heads it may be stated that inasmuch as the two numbering-heads act upon opposite sides of an intervening platen the successive wheels of one head must be arranged from left to right, while those of the other head are arranged from right to left. In printing units alone the units-wheel of one head should stand in the same vertical plane with the units-wheel of the other head in order that the figures upon opposite sides of the same leaf may coincide in position and may not show through, as might be the case if the figures were offset. In printing the tens and units it is necessary that the units-wheel of the upper head shall stand in the same vertical plane with the tens-wheel of the lower head, the tens-wheel of the upper head standing in the same vertical plane with the units-wheel of the lower head. A similar but further change of the relation between the two heads must take place when hundreds, tens, and units are to be printed. This change of relation is readily effected, as will now be understood, by shifting only one of the numbering-heads.

As each page is printed on one side it is carried down onto a bracket or arm 34, which is pivoted at its inner end and adapted to be pressed up at its outer end by means of the arm 35, secured to the arm that bears the lower numbering-head, thus clamping the sheet. The arm 35 moves forward, engaging with the bracket 34, lifting up its outer end, and with it a corner of the page which has fallen down on it, raising and holding it in position against the lower or under side of the printing platens or table W', to be printed on its under side by the lower numbering-head F'.

When, as above described, a page of a book has been printed on with the appropriate number on its upper side by the upper numbering-head, it must be turned or carried down into position to be printed on its opposite or under side by the lower numbering-head, and for this purpose is provided a revolving finger V, which is pivoted at its center point to a shaft V', to which is secured a cog-wheel W, which is adapted to engage with a toothed segment Y, supported on the same shaft or spindle which unites the inner ends of the curved pieces D D', that support or carry the numbering-heads on their outer or free ends, so that whenever the arms C C' move together, thereby moving the curved arms D D' and the numbering-heads which they support, the shaft to which these curved arms are attached will also move, moving the segment Y downwardly, thereby rotating the cog-wheel W. By this operation of the machine the spring-finger has not been turned and the finger is only turned on the returned motion of the parts. This is accomplished by means of a pawl 2, which is connected to the cog-wheel W, and which pawl on the return motion engages with a ratchet-wheel 3, securely attached to the shaft V', the pawl riding over the ratchet on the forward or printing operation of the machine, said finger being held from backward movement by the stop-pawl 2', and said feed-pawl 2 engaging with the teeth to turn the finger V when the parts go back, whereby this finger strikes the corner of the page when printed on by the upper numbering-head, throwing it down onto the bracket 34 above referred to, and, as will be seen, the spring-finger makes a half-revolution each time that it moves.

Figure 3:
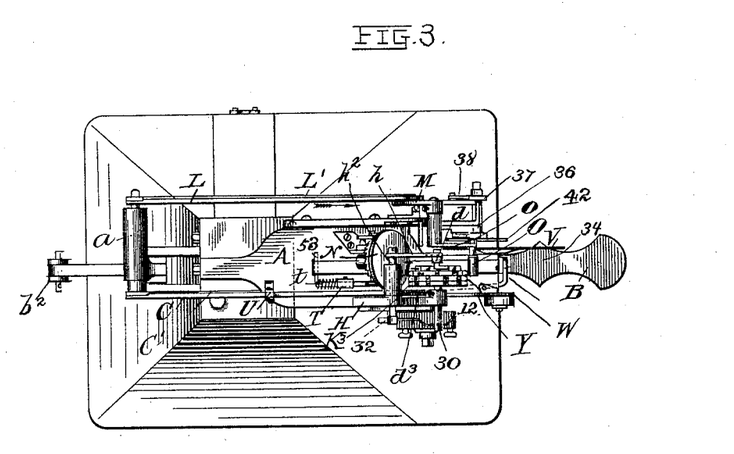
Fig. 3 is a top view of the machine shown in Fig. 1.
Figure 4:
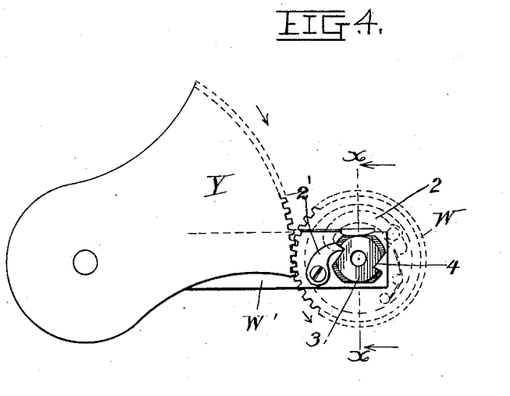
Fig. 4 is a detailed view of the segment and gearwheel which engages therewith to operate the finger that turns or throws down the sheet after being printed on the upper side into position for printing on the opposite side.

After each sheet has been printed on both sides in the manner above explained the finger V in its next semirevolution deflects the corner of the sheet or pushes the sheet off the bracket 34, whereupon it is caught and held out of the way of the under numbering-head by the device shown in Figs. 2 and 3, which is as follows: On one end of a shaft 36, secured on bearings in the standard, is affixed a ratchet-wheel 37, which ratchet-wheel is adapted to be engaged by a spring-pawl 38, secured to a curved piece 39, which is struck by a projection or lug 40 on the cam M' each time that the cam moves upward in the operation of the machine, thereby rotating the ratchet-wheel 37, which rotates the shaft 36, and at the other end of the shaft 36 is a corresponding star-wheel 41, secured to the shaft, with which ratchet-wheel 41 engages a stop-pawl 41ª to prevent backward rotation of the shaft 36. A star-wheel 42 is secured upon the shaft 36, alongside of the ratchet-wheel 41, and this star-wheel has a series of arms, and as it is rotated with the shaft 36 one of its arms strikes the corner of the page and carries it down out of the way, and a spring 43 is connected with the curved piece 38 to restore it to its original position after it has been moved.

To prevent the sheets from being smeared with ink, a suitable smut-belt is provided, which consists of a strip of linen, muslin, or other suitable material which passes between guides 50 51 in front of the machine, passing back over rollers 52, 53, and 54 down around rollers 55, 56, 57, 58, and 59, and this smut-belt is drawn at each return motion of the lever B by means of an arm 60, which is connected with the lever B, which arm is attached to a short arm 61, which supports the roller 59 at one end and at the other end a projection 62, which bears against a projection 63 on an arm 64, secured to the side of the standard, between which projection 62 and projection 63 the smut-belt passes, and which is locked or held between them when the lever B returns, the arm 61 and the projection 62 being forced against the projection 63 by the return of the lever, fastening the smut-belt between them, so that whatever ink is taken up by the belt either from the printed pages or from the numbering-heads will be carried away from the printing table or impression-bed.

The operation of the mechanism above described and shown in the drawings will be clearly understood from the foregoing description. We do not limit our invention, however, to the number, construction, and relative arrangement of the parts and devices shown in the drawings and hereinabove described, comprising a machine embodying our invention; but What we do claim as our invention, and desire to secure by Letters Patent, is—

1. In a paging-machine the combination with a single impression-bed, a pair of reciprocating numbering mechanisms working one above and one below said single impression-bed and adapted to apply numbers or other marks to two pages of a book at the same time, a pair of inking-rollers adapted to supply ink upon the printing-surfaces of said numbering mechanisms and means to operate said numbering mechanisms and the inking-rollers, substantially as set forth.

2. In a paging-machine the combination with a single impression-bed, a pair of reciprocating numbering mechanisms working one above and one below said single impression-bed and each composed of one or more disks having suitable type on their peripheries, said disks being adapted to rotate, and to apply numbers to two pages of a book at the same time, inking devices to supply ink to the printing-faces of the type on said numbering-disks and means to operate said numbering-disks and inking devices, substantially as set forth.

3. In a paging-machine the combination with a single impression-bed, a pair of reciprocating numbering mechanisms working one above and one below said single impression-bed and each composed of one or more disks having suitable type on their peripheries, said disks being adapted to rotate and to apply numbers to two pages of a book at the same time, inking devices to supply ink to the printing-faces of the type on said numbering-disks and means to operate the arms supporting the said disks to cause them to move toward each other, substantially as set forth.

4. In a paging-machine the combination with a single impression-bed, a pair of reciprocating numbering mechanisms working one above and one below said single impression-bed and composed of one or more disks having suitable type on their peripheries, said disks being supported on the free ends of a pair of arms loosely pivoted together at their other ends and adapted to move toward each other from opposite directions, said disks being adapted to rotate and to apply numbers to two pages of a book at the same time and a pair of inking-rollers to supply ink to the printing-faces of the type on said numbering-disks, said inking-rollers being separately pivoted and adapted to swing into and out of contact with the numbering-disks, and means to operate the numbering-disks and the inking-rollers, substantially as set forth.

5. In a paging-machine the combination with a single impression-bed, a pair of reciprocating numbering mechanisms working one above and one below said single impression-bed and composed of one or more disks having type on their peripheries, said disks being supported on the free ends of a pair of arms which are loosely pivoted together at their other ends and adapted to move toward each other from opposite directions, said disks being adapted to rotate and to apply the numbers to two pages of a book at the same time, a pair of inking-rollers to supply ink to the printing-faces of the type on the numbering-disks, said inking-rollers being supported on separate arms having fixed pivotal points and means to operate said arms of the numbering-disks and inking-rollers to cause the number-ing mechanisms to move toward each other and the inking-rollers to move into and out of contact with the numbering-disks substantially as set forth.

6. In a paging-machine the combination with a single impression-bed, a pair of reciprocating numbering mechanisms working one above and one below said single impression-bed and composed of one or more disks having type on their peripheries, said disks being supported on the free ends of a pair of arms which are loosely pivoted together at their other ends and adapted to move toward each other and to apply numbers to two pages of a book at the same time, a pair of inking-rollers to supply ink to the printing-faces of the type on the numbering-disks, said inking-rollers being supported on arms having separate pivotal points and adapted to swing into and out of contact with the numbering-disks, a pair of arms each of said arms being connected to of arms each of said ink-roller arms at one end and one of said arms being pivoted together at their other ends and means to operate said arms to cause the numbering-disks to move toward each other and to actuate the inking-rollers, substantially as set forth.

7. In a paging-machine the combination with a single impression-bed, a pair of reciprocating numbering mechanisms working one above and one below said single impression-bed and composed of one or more disks having type on their peripheries said disks being supported on the free ends of a pair of arms which are loosely pivoted together at their other ends and adapted to move toward each other and to apply the numbers to two pages of a book at the same time, a pair of inking devices to supply ink to the printing-faces of the type on the numbering-disks, said inking-rollers being supported on separate arms having separate fixed pivotal points, means to operate said arms to cause the numbering-disks to move toward each other and the inking-rollers to move into and out of contact with the numbering-disks and a pair of inking-platens over the surfaces of which said rollers are moved to obtain ink therefrom substantially as set forth.

8. In a paging-machine the combination with a single impression-bed, a pair of reciprocating numbering mechanisms working one above and one below said single impression-bed and composed of one or more disks having type on their peripheries, said disks being supported on the free ends of a pair of arms which are loosely pivoted together at their other ends and adapted to move toward each other and to apply numbers to two pages of a book at the same time, a pair of inking-rollers to supply ink to the printing-faces of the type on the numbering-disks, said inking-rollers being supported on arms having separate pivotal points, means to operate said arms to cause the numbering-disks to move toward each other and the inking-rollers to move into and out of contact with the numbering-disks, a pair of inking-platens over the surfaces of which said rollers are moved, and a pivoted arm or finger adapted to rotate to turn down the pages of the book when printed on, substantially as set forth.

9. In a paging-machine the combination with a single impression-bed, a pair of reciprocating mechanisms working one above and one below said single impression-bed and composed of two or more disks having type on their peripheries, said disks being supported on the free ends by a pair of arms which are loosely pivoted together at their other ends and adapted to move toward each other from opposite directions, said disks being adapted to rotate and to apply numbers in rotation to two pages of a book at the same time, and means connected with one of said separate numbering mechanisms to shift it to enable the disks to print the numbers on the pages in substantially the same perpendicular plane on both sides when printing in rotation from units to tens, from tens to hundreds, &c., and means forming part of the numbering mechanisms to throw into operation two or more of said disks at the same time that the mechanism shifts, substantially as set forth.

10. In a paging-machine the combination with a supporting-standard, of the arms C C', curved arms D D' and the numbering-heads F F' connected therewith consisting of one or more disks having type on their peripheries, arms L L', cams M M', arms o o' and inking-rollers O O' attached thereto, ink-platens N N' having teeth s s' on their under faces adapted to be engaged by a pawl R R' springs r r' shafts S S' and springs t t' lever B, and spring G, all arranged constructed and adapted to operate substantially as and for the purpose set forth.

11. In a paging-machine the combination of the numbering-heads F F', the arms D D' pivoted together and carrying said heads F F' at their free ends the arms C C' pivoted together and connected at their free ends by pins and slots in said arms D D' the inking-rollers O O', the pivoted arms o o' carrying said inking-rollers O O' the cams M M' secured to said arms o o' and having grooves therein and carrying the pins P P' the arms L L' pivoted together and having pins n n' working in the grooves of said cams M M' and having slots to receive the pins P P' devices for supplying ink to said inking-rollers, an impression-bed and means for actuating said arms C C' and L L' substantially as set forth.

12. In a paging-machine the combination with a single impression-bed, a pair of reciprocating numbering mechanisms working one above and one below said single impression-bed and supported on the free ends of a pair of arms which are loosely pivoted together at their other ends and are adapted to move together from opposite directions and to apply numbers to two pages of a book at the same time, a pair of inking devices to supply ink to the printing-faces of said numbering mechanisms and means for retarding the movement of the numbering mechanisms until after the inking devices have moved a slight distance giving a slight lead to said inking devices, substantially as set forth.

13. In a paging-machine the combination with a single impression-bed, a pair of reciprocating numbering mechanisms working one above and one below said single impression-bed, and composed of one or more disks having suitable type on their peripheries, said disks being supported on a pair of arms which are loosely pivoted together at their other ends and adapted to move toward each other and to apply numbers to two pages of a book at the same time, a pair of inking-rollers to supply ink to the printing-faces of the type on said disks and means connected with said arms to retard the movement of the numbering-disks until after the inking-rollers have moved a slight distance to give a slight lead thereto, substantially as set forth.

14. In a paging-machine the combination with a single impression-bed, a pair of reciprocating numbering mechanisms working one above and one below said single impression-bed and supported on the free ends of a pair of pivoted arms, a pair of actuating-arms engaging with said supporting-arms, a groove in the outer ends of each of said actuating-arms to retard the motion of said numbering mechanisms, a pair of inking-rollers adapted to supply ink to the printing-faces of said numbering mechanisms adapted to move a slight distance in advance of the numbering mechanisms, and means to operate said numbering mechanisms and inking-rollers, substantially as set forth.

15. In a paging-machine the combination with a single impression-bed, a pair of reciprocating numbering mechanisms working one above and one below said single impression-bed and adapted to apply numbers to two pages of a book at the same time, a pair of inking devices adapted to supply ink to the printing-surfaces of said numbering mechanisms, means to operate said numbering mechanisms and inking devices and a device to turn down the pages of the book from the upper to the lower surface of said impression-bed and an arm adapted to hold a page up against the lower surface of said impression-bed while said page is being printed upon, substantially as set forth.

16. In a paging-machine the combination with a pair of reciprocating numbering mechanisms adapted to apply numbers to two pages of a book at the same time, a pair of inking devices adapted to supply ink to the printing-surfaces of said numbering mechanisms, means to operate said numbering mechanisms and inking devices, an impression-bed, a device to turn down the pages of the book when printed on, and a separate device to engage with and move and hold down the printed pages, after the same have been printed upon substantially as set forth.

17. In a paging-machine the combination with a single impression-bed, a pair of reciprocating numbering mechanisms working one above and one below said single impression-bed, inking devices therefor a device to successively turn down the pages of the book from the upper to the lower surface of said impression-bed and to successively move the pages from the lower surface of said impression-bed and a rotary star-wheel adapted to engage the pages thus moved from the lower surface of the impression-bed and to hold said pages away from the impression-bed and numbering mechanisms, substantially as set forth.

18. In a paging-machine the combination with a single impression-bed, a pair of reciprocating numbering mechanisms working one above and the other below said single impression-bed, inking devices therefor, a revolving finger operating to successively turn down the pages of the book from the upper to the lower surface of said impression-bed and to successively move the pages from the lower surface of said impression-bed, an arm adapted to hold the page up against the lower surface of said impression-bed while said page is being printed upon and a rotary star-wheel adapted to engage the pages moved from the lower surface of said impression-bed and to hold said pages away from the impression-bed and numbering mechanisms, substantially as set forth.

19. In a paging-machine the combination with a single impression-bed, a pair of reciprocating numbering mechanisms composed of disks having suitable type on their peripheries and working one above and one below said single impression-bed, one of said numbering mechanisms being laterally movable of means for actuating said disks to bring successive type into printing position and a ratchet-wheel and a pawl for progressively actuating said ratchet-wheel and a cam on said wheel arranged to laterally shift said movable numbering mechanisms when the denomination printed by the disks of said numbering mechanisms is changed, substantially as set forth.

This specification signed and witnessed this 16th day of September, 1892.

EDWARD G. BLACK.
JOHN F. WERLE.

In presence of—
JESSE SMITH,
JAS. W. IRWIN.